(12) United States Patent
Lee et al.

(10) Patent No.: US 12,555,768 B2
(45) Date of Patent: Feb. 17, 2026

(54) CATHODE ACTIVE MATERIAL FOR LITHIUM SECONDARY BATTERY AND LITHIUM SECONDARY BATTERY INCLUDING THE SAME

(71) Applicant: SK INNOVATION CO., LTD., Seoul (KR)

(72) Inventors: Yoon Ji Lee, Daejeon (KR); Sang Han Lee, Daejeon (KR); Min Suk Kang, Daejeon (KR); Yong Hyun Cho, Daejeon (KR)

(73) Assignee: SK On Co., Ltd., Seoul (KR)

( * ) Notice: Subject to any disclaimer, the term of this patent is extended or adjusted under 35 U.S.C. 154(b) by 155 days.

(21) Appl. No.: 17/522,361

(22) Filed: Nov. 9, 2021

(65) Prior Publication Data

US 2022/0149346 A1   May 12, 2022

(30) Foreign Application Priority Data

Nov. 9, 2020  (KR) ........................ 10-2020-0148777

(51) Int. Cl.
| | |
|---|---|
| *H01M 4/131* | (2010.01) |
| *H01M 4/02* | (2006.01) |
| *H01M 4/525* | (2010.01) |
| *H01M 10/0525* | (2010.01) |

(52) U.S. Cl.
CPC .......... *H01M 4/131* (2013.01); *H01M 4/525* (2013.01); *H01M 10/0525* (2013.01); *H01M 2004/027* (2013.01)

(58) Field of Classification Search
CPC ....... H01M 10/0525; H01M 2004/027; H01M 2003/028
See application file for complete search history.

(56) References Cited

U.S. PATENT DOCUMENTS

| | | | |
|---|---|---|---|
| 10,297,822 B2* | 5/2019 | Endo | ................. H01M 10/0525 |
| 2015/0108398 A1* | 4/2015 | Kase | ..................... C01G 53/50 |
| | | | 252/182.1 |
| 2016/0133927 A1* | 5/2016 | Kamata | ................. H01M 4/505 |
| | | | 252/182.1 |

(Continued)

FOREIGN PATENT DOCUMENTS

| | | |
|---|---|---|
| CN | 108432000 A | 8/2018 |
| CN | 108832075 A | 11/2018 |

(Continued)

OTHER PUBLICATIONS

WO2019194609A1_Machine Translation (Year: 2019).*

(Continued)

*Primary Examiner* — Jonathan G Leong
*Assistant Examiner* — Aryana Y. Ortiz
(74) *Attorney, Agent, or Firm* — IP & T GROUP LLP

(57) ABSTRACT

The cathode active material for a lithium secondary battery includes lithium-transition metal composite oxide particles having a crystal grain size of less than 300 nm measured through XRD analysis and an XRD peak intensity ratio of 7% or more. The present invention provides a lithium secondary battery with improved life-span properties and output properties by controlling the crystal grain size and XRD peak intensity ratio of lithium-transition metal composite oxide particles.

14 Claims, 1 Drawing Sheet

(56) References Cited

U.S. PATENT DOCUMENTS

| | | | | |
|---|---|---|---|---|
| 2016/0164093 A1* | 6/2016 | Inoue | ............... | H01M 4/505 429/223 |
| 2016/0268594 A1* | 9/2016 | Kim | ............... | H01M 10/0525 |
| 2018/0316005 A1* | 11/2018 | Shin | ............... | H01M 4/0471 |
| 2019/0252678 A1* | 8/2019 | Sakai | ............... | C01G 53/44 |
| 2020/0006765 A1* | 1/2020 | Tan | ............... | H01M 4/131 |

FOREIGN PATENT DOCUMENTS

| | | | | |
|---|---|---|---|---|
| CN | 108878892 A | | 11/2018 | |
| CN | 110637384 A | | 12/2019 | |
| CN | 111446488 A | | 7/2020 | |
| JP | 2002-279985 A | | 9/2002 | |
| JP | 2004-288398 A | | 10/2004 | |
| KR | 10-2017-0093085 A | | 8/2017 | |
| WO | WO-2019194609 A1 * | 10/2019 | ............ | C01G 53/00 |

OTHER PUBLICATIONS

JP2004288398A_Machine translation (Year: 2004).*

Yan et al., A review on doping/coating of nickel-rich cathode materials for lithium-ion batteries, Journal of Alloys and Compounds, 2020, pp. 1-14, vol. 819, Elsevier.

Office Action for the Chinese Patent Application No. 202111321424.4 issued by the Chinese Patent Office on Mar. 31, 2023.

Yin Ding et al., A short review on layered $LiNi_{0.8}Co_{0.1}Mn_{0.1}O_2$ positive electrode material for lithium-ion batteries, Energy Procedia, 2017, p. 2941-2952, vol. 105, Elsevier.

Extended European Search Report issued by the European Patent Office on Apr. 4, 2022.

Office Action for the Chinese Patent Application No. 202111321424.4 issued by the Chinese Patent Office on Oct. 12, 2023.

Industry Patent Analysis Report (vol. 23), Intellectual Property Publishing House Co., Ltd., May 2014, pp. 196-197.

* cited by examiner

[FIG. 1]
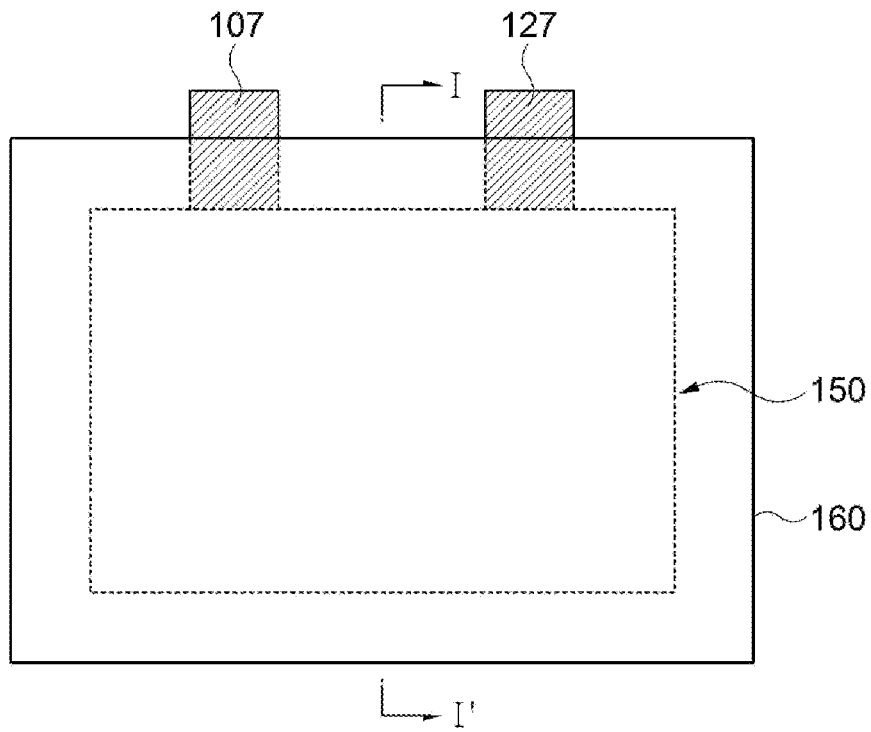
[FIG. 2]
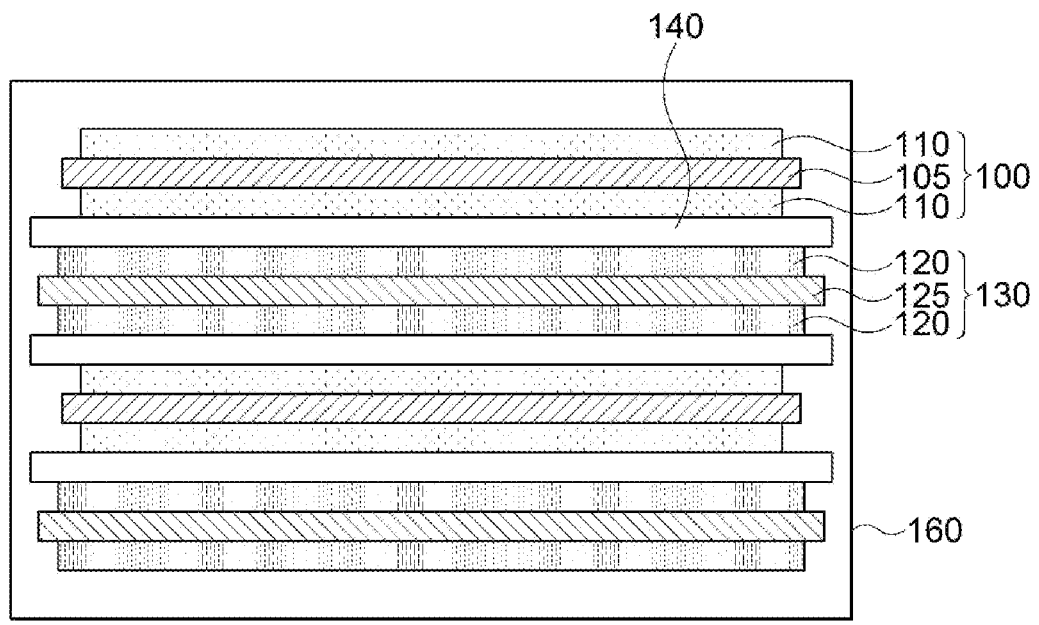

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2020-0148777 filed on Nov. 9, 2020 in the Korean Intellectual Property Office (KIPO), the entire disclosure of which is incorporated by reference herein.

BACKGROUND OF THE INVENTION

1. Field of the Invention

The present invention relates to a cathode active material for a lithium secondary battery and a lithium secondary battery including the same, and more specifically, to a cathode active material for a lithium secondary battery, which includes a lithium-transition metal composite oxide, and a lithium secondary battery including the same.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include: an electrode assembly including a cathode, an anode, and a separation membrane (separator); and an electrolyte in which the electrode assembly is impregnated. The lithium secondary battery may further include, for example, a pouch-shaped outer case in which the electrode assembly and the electrolyte are housed.

In the lithium secondary battery, a lithium metal oxide is used as a cathode active material, and it is preferable to have a high capacity, a high output, and high life-span properties. However, when designing the lithium metal oxide for a high output composition, thermal and mechanical stabilities may be deteriorated, and thereby life-span properties and operational reliability of the lithium secondary battery may be deteriorated.

For example, Korean Patent Laid-Open Publication No. 10-2017-0093085 discloses a cathode active material including a transition metal compound and an ion adsorbing binder, but there is a limitation in securing sufficient life-span properties and stability.

PRIOR ART DOCUMENT

Patent Document

Korean Patent Laid-Open Publication No. 10-2017-0093085

SUMMARY OF THE INVENTION

It is an object of the present invention to provide a cathode active material for a lithium secondary battery having excellent operational stability and reliability.

Another object of the present invention is to provide a lithium secondary battery including a cathode active material having excellent operational stability and reliability.

To achieve the above objects, according to an aspect of the present invention, there is provided a cathode active material for a lithium secondary battery, including lithium-transition metal composite oxide particles having a crystal grain size measured through X-ray diffraction (XRD) analysis of less than 300 nm and having an XRD peak intensity ratio defined by Equation 2 below of 7% or more:

XRD peak intensity ratio (%)=100×$I$(110)/{$I$(110)+$I$(003)}    [Equation 2]

(In Equation 2, I(110) is a maximum height of a peak of a (110) plane of the lithium-transition metal composite oxide particles by the XRD analysis, and I(003) is a maximum height of a peak of a (003) plane of the lithium-transition metal composite oxide particles by the XRD analysis).

In some embodiments, the crystal grain size may be measured through Equation 1 below:

$$L = \frac{0.9\lambda}{\beta\cos\theta} \quad [\text{Equation 1}]$$

(In Equation 1, L is the crystal grain size (nm), λ is an X-ray wavelength (nm), β is a full width at half maximum (rad) of the peak of the (003) plane, and θ is a diffraction angle (rad)).

In some embodiments, the lithium-transition metal composite oxide particles may have the crystal grain size of 100 nm or more and less than 300 nm.

In some embodiments, the lithium-transition metal composite oxide particles may have the crystal grain size of 150 to 265 nm.

In some embodiments, the lithium-transition metal composite oxide particles may have the XRD peak intensity ratio of 7 to 12%.

In some embodiments, the lithium-transition metal composite oxide particles may have the XRD peak intensity ratio of 9 to 11%.

In some embodiments, the lithium-transition metal composite oxide particles may have an XRD peak area ratio defined by Equation 3 of 16% or more:

XRD peak area ratio (%)=100×$A$(110)/{$A$(110)+$A$(003)}    [Equation 3]

(In Equation 3, A(110) is a peak area of the (110) plane of the lithium-transition metal composite oxide particles by the X-ray diffraction (XRD) analysis, and A(003) is a peak area of the (003) plane by the XRD analysis).

In some embodiments, the lithium-transition metal composite oxide particles may have the XRD peak area ratio of 16 to 19%.

In some embodiments, the lithium-transition metal composite oxide particles may have a particle diameter ($D_{50}$) of 3 to 16 μm.

In some embodiments, the lithium-transition metal composite oxide particles may have the particle diameter of 10 to 15 μm.

In some embodiments, the lithium-transition metal composite oxide particles may have a composition represented by Formula 1 below:

$$Li_xNi_{1-y}M_yO_{2+z}$$ [Formula 1]

(In Formula 1, x, y and z are in a range of 0.9≤x≤1.2, 0≤y≤0.7, and −0.1≤z≤0.1, respectively, and M is at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr).

In some embodiments, the lithium-transition metal composite oxide particles may be prepared by reacting a transition metal precursor with a lithium precursor.

In some embodiments, the transition metal precursor may be a Ni—Co—Mn precursor.

In some embodiments, y of Formula 1 may be 0.2 or less.

In some embodiments, y of Formula 1 may be 0.1 or less.

In some embodiments, the lithium-transition metal composite oxide particles may have a coating element, and the coating element may include at least one element selected from a group consisting of Al, Ti, Ba, Zr, Si B, Mg and P.

In some embodiments, the lithium-transition metal composite oxide particles may have a doping element, and the doping element may include at least one element selected from a group consisting of Al, Ti, Ba, Zr, Si B, Mg and P.

According to another aspect of the present invention, there is provided a lithium secondary battery including: a cathode which includes a cathode active material layer including the cathode active material according to the above-described embodiments; and an anode facing the cathode.

The lithium secondary battery according to the above-described exemplary embodiments may include the lithium-transition metal composite oxide particles having a crystal grain size of less than 300 nm as a cathode active material and satisfying an X-ray diffraction (XRD) peak intensity ratio of 7% or more. Accordingly, it is possible to prevent a deterioration of the battery by increasing the life-span properties while preventing a decrease in output properties.

In exemplary embodiments, by decreasing the crystal grain size of the above particles to less than 300 nm, it is possible to prevent a deterioration in the output properties of the battery due to an excessive increase in a migration distance of lithium ions intercalated/deintercalated during charging and discharging of the secondary battery.

In exemplary embodiments, by adjusting the XRD peak intensity ratio to 7% or more, the lithium ion diffusion distance may be increased, and in this case, a cation mixing phenomenon which causes a deterioration of the battery may be reduced. Accordingly, a deterioration rate of the battery may be reduced, such that a gas generation amount may be reduced and life-span stability may be enhanced.

Therefore, the lithium-transition metal composite oxide particles satisfying the above-described ranges of the crystal grain size and XRD peak intensity ratio may provide improved operational stability and life-span properties while maintaining desired output properties.

BRIEF DESCRIPTION OF THE DRAWINGS

The above and other objects, features and other advantages of the present invention will be more clearly understood from the following detailed description taken in conjunction with the accompanying drawings, in which:

FIGS. 1 and 2 are a schematic plan view and a cross-sectional view of a lithium secondary battery according to exemplary embodiments, respectively.

DETAILED DESCRIPTION OF THE INVENTION

Embodiments of the present invention provide a lithium secondary battery including lithium-transition metal composite oxide particles having a crystal grain size and an XRD peak intensity ratio in a predetermined range, respectively, as a cathode active material.

Hereinafter, exemplary embodiments of the present invention will be described in detail with reference to the accompanying drawings. However, these embodiments are merely an example, and the present invention is not limited to the specific embodiments described as the example.

FIGS. 1 and 2 are a schematic plan view and a cross-sectional view of a lithium secondary battery according to exemplary embodiments, respectively. Hereinafter, a cathode active material for a lithium secondary battery and a lithium secondary battery including the same will be described together with reference to FIGS. 1 and 2.

Referring to FIGS. 1 and 2, the lithium secondary battery may include an electrode assembly including a cathode 100, an anode 130, and a separation membrane 140 interposed between the cathode and the anode. The electrode assembly may be housed together with the electrolyte in the case 160 to be impregnated.

The cathode 100 may include a cathode active material layer 110 formed by applying a cathode active material to a cathode current collector 105. The cathode active material may include a compound capable of reversibly intercalating and deintercalating lithium ions.

In exemplary embodiments, the cathode active material may include lithium-transition metal composite oxide particles.

For example, the lithium-transition metal composite oxide particles include nickel (Ni), and may further include at least one of cobalt (Co) and manganese (Mn).

For example, the lithium-transition metal composite oxide particles may be represented by Formula 1 below.

$$Li_xNi_{1-y}M_yO_{2+z}$$ [Formula 1]

In Formula 1, x, y and z may be in a range of 0.9≤x≤1.2, 0≤y≤0.7, and −0.1≤z≤0.1, respectively. M may represent at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr.

In some embodiments, a molar ratio or concentration (1−y) of Ni in Formula 1 may be 0.8 or more, and may exceed 0.8 in a preferred embodiment. For example, the molar ratio or concentration (1−y) of Ni may be 0.9 or more. In this case, since a high content of Ni is included in the cathode active material, output properties of the secondary battery may be improved.

Ni may be provided as a transition metal associated with the output and capacity of the lithium secondary battery. Therefore, as described above, by employing a composition of high-nickel (high-Ni) contents in the lithium-transition metal composite oxide particles, it is possible to provide a high-power cathode and a high-power lithium secondary battery.

In this regard, as the content of Ni is increased, long-term storage stability and life-span stability of the cathode or secondary battery may be relatively deteriorated. However, according to exemplary embodiments, by including Co, the life-span stability and capacity retention properties may be improved through Mn while maintaining electrical conductivity.

In some embodiments, the cathode active material or the lithium-transition metal composite oxide particles may further include a coating element or doping element. For example, the coating element or doping element may include Al, Ti, Ba, Zr, Si, B, Mg, P, or an alloy thereof or an oxide thereof. These may be used alone or in combination of two or more thereof. The cathode active material particles are passivated by the coating or doping element, thereby stability and life-span for penetration of an external object may be more improved.

In example embodiments, the lithium-transition metal composite oxide particles may have a crystal grain size of less than 300 nm.

Commonly, when the crystal grain size of the particles is increased, a propagation length that is required for lithium ions to be intercalated/deintercalated during charging and discharging of the battery may be increased, and thus initial output properties may be deteriorated.

However, according to exemplary embodiments, by employing the lithium-transition metal composite oxide particles having a crystal grain size of less than 300 nm, it is possible to prevent a deterioration in the output properties of the battery due to excessively increasing a migration distance of lithium ions during charging and discharging of the secondary battery as the crystal grain size is increased.

In exemplary embodiments, the "crystal grain size" is a numerical value measured through X-ray diffraction (XRD) analysis. The crystal grain size may be calculated and obtained through the Scherrer equation (Equation 1 below) using a full width at half maximum (FWHM) obtained through the XRD analysis.

$$L = \frac{0.9\lambda}{\beta \cos\theta} \quad \text{[Equation 1]}$$

In Equation 1 above, L represents the crystal grain size (nm), λ represents an X-ray wavelength (nm), β represents the full width at half maximum (rad) of the corresponding peak, and θ represents a diffraction angle (rad). According to exemplary embodiments, the full width at half maximum in XRD analysis for measuring the crystal grain size may be measured from the peak of a (003) plane.

In some embodiments, β in Equation 1 above may use the full width at half maximum corrected for a value derived from equipment. In one embodiment, Si may be used as a standard material for reflecting the equipment-derived value. In this case, by plotting full width at half maximum profiles in a full range of 2θ of Si, the equipment-derived full width at half maximum may be represented as a function of 2θ. Thereafter, a value corrected by subtracting the equipment-derived full width at half maximum value in the corresponding 2θ obtained from the above function may be used as β.

When the crystal grain size is excessively decreased, particle strength is reduced in a high-Ni environment, and thus particle cracks may occur during a press process for forming the cathode active material layer 110. Accordingly, an electrolyte may penetrate into the particles, thereby resulting in gas generation due to a side reaction, and life-span properties of the lithium-transition metal composite oxide particles may be deteriorated.

In some embodiments, the particles may have a crystal grain size of 100 nm or more and less than 300 nm, and preferably 150 to 265 nm. In the above range, it is possible to effectively maintain thermal stability and life-span properties while sufficiently implementing high output and high capacity through the composition of high-Ni contents.

For example, the lithium-transition metal composite oxide particles may be prepared by wet or dry-mixing a nickel-manganese-cobalt precursor (e.g., nickel-cobalt-manganese hydroxide) with a lithium precursor (e.g., lithium hydroxide or lithium carbonate) and performing a reaction, followed by performing calcination treatment on the reactant.

In one embodiment, the crystal grain size of the lithium-transition metal composite oxide particles may be controlled by adjusting a calcination temperature.

The lithium-transition metal composite oxide particle may have a single crystal structure and/or polycrystalline structure in crystallography. In an embodiment, the cathode active material may include a mixture or blend of single crystal particles and polycrystalline particles having the above-described crystal grain size.

The lithium-transition metal composite oxide particles may have a form of single particles, primary particles or secondary particles in morphology.

In example embodiments, the lithium-transition metal composite oxide particles may have an XRD peak intensity ratio of 7% or more, which is defined by Equation 2 below.

$$\text{XRD peak intensity ratio (\%)} = 100 \times I(110)/\{I(110)+I(003)\} \quad \text{[Equation 2]}$$

In Equation 2, I(110) represents a peak intensity or maximum height of the peak of an (110) plane of the lithium-transition metal composite oxide particles by the X-ray diffraction (XRD) analysis, and I(003) represents a peak intensity or maximum height of the peak of the (003) plane by the XRD analysis.

For example, the XRD analysis may be performed by using Cu-Kα rays as a light source for the dried powder of the lithium-transition metal composite oxide particles in a diffraction angle (2θ) range of 10° to 120° at a scan rate of 0.0065°/step.

In high-Ni lithium-transition metal composite oxide particles, for example, lithium ions ($Li^+$) and nickel ions ($Ni^{2+}$) in a lithium layer are irreversibly substituted with each other at a high temperature to cause a cation mixing phenomenon in which the battery is deteriorated. The cation mixing phenomenon propagates from a surface of the (110) plane to an inside, and when a diffusion length of lithium ions is increased, substitution of lithium ions with nickel ions is decreased, thereby reducing a structural deterioration due to cation mixing.

In the above-described XRD peak intensity ratio range, the ion propagation length and ion diffusion length at the (110) plane through which the lithium ions are diffused may be increased. In addition, by adjusting a ratio of the peak intensity to the (003) plane intersecting the (110) plane, an aspect ratio of the particles may be controlled. In this case, the cation mixing may be reduced, such that a deterioration area of the lithium-transition metal composite oxide particles may be decreased. Accordingly, life-span properties at the high temperature and during charging/discharging may be improved, and the gas generation amount may be reduced.

In addition, for example, as described above, a decrease in the relative life-span properties caused by reducing the crystal grain size to less than 300 nm may be alleviated or compensated by adjusting the XRD peak intensity ratio.

Thus, it is possible to increase the output/capacity by increasing the lithium ion migration properties through the control of the crystal grain size, and improve life-span stability by preventing the cation mixing through the control of the XRD peak intensity ratio.

In some embodiments, the lithium-transition metal composite oxide particles may have an XRD peak intensity ratio of 7 to 12%, and preferably 9 to 11%. In the above range, it is possible to prevent the output properties from being deteriorated due to an excessive increase in the long migration path of lithium ions, while maintaining the surface stability and life-span properties of the lithium-transition metal composite oxide particles.

In some embodiments, the lithium-transition metal composite oxide particle may have an XRD peak area ratio of 16% or more, which is defined by Equation 3 below.

$$\text{XRD peak area ratio (\%)} = 100 \times A(110)/\{A(110)+A(003)\} \quad \text{[Equation 3]}$$

In Equation 3, A(110) represents a peak area of the (110) plane of the lithium-transition metal composite oxide particles by the X-ray diffraction (XRD) analysis, and A(003) represents a peak area of the (003) plane by the XRD analysis.

By adjusting the peak area ratio together with the above-described peak intensity ratio, an effect of controlling the diffusion length of lithium ions and aspect ratio through an XRD value may be better implemented.

In a preferred embodiment, the XRD peak area ratio may be 16 to 19%.

In some embodiments, the lithium-transition metal composite oxide particles may have a mean particle diameter ($D_{50}$) of 3 to 16 µm. In this case, it is possible to prevent a decrease in the mechanical strength and chemical stability of the cathode active material due to an excessive decrease in the particle diameter, and thereby, gas generation due to particle cracks during the press process for forming the cathode active material layer 110 may be prevented. In addition, it is possible to reduce particle cracks of the high-Ni cathode active material, which may be caused when contraction/expansion of a volume of the cathode active material are repeated, for example, according to the repetition of charging and discharging.

In the present invention, the "particle diameter" or "$D_{50}$" may refer to a particle diameter when a volume accumulation percentage in the particle diameter distribution obtained from the volume of the particles corresponds to 50%.

In some embodiments, the lithium-transition metal composite oxide particles may have a particle diameter of 10 to 15 µm. In this case, it is possible to reduce the gas generation amount and improve the life-span properties while preventing the output properties from being deteriorated due to an excessive increase in the particle diameter of the particles.

For example, a transition metal precursor (e.g., Ni—Co—Mn precursor) for preparing the lithium-transition metal composite oxide particles may be prepared through a co-precipitation reaction.

The above-described transition metal precursor may be prepared through a co-precipitation reaction of metal salts. The metal salts may include nickel salts, manganese salts and cobalt salts.

Examples of the nickel salt may include nickel sulfate, nickel hydroxide, nickel nitrate, nickel acetate, and a hydrate thereof, etc. Examples of the manganese salt may include manganese sulfate, manganese acetate, and a hydrate thereof, etc. Examples of the cobalt salt may include cobalt sulfate, cobalt nitrate, cobalt carbonate, and a hydrate thereof, etc.

The metal salts may be mixed with a precipitant and/or a chelating agent in a ratio satisfying the content of each metal or the concentration ratios described with reference to Formula 1 to prepare an aqueous solution. The aqueous solution may be co-precipitated in a reactor to prepare the transition metal precursor.

The precipitant may include an alkaline compound such as sodium hydroxide (NaOH), sodium carbonate ($Na_2CO_3$) and the like. The chelating agent may include, for example, ammonia water (e.g., $NH_3H_2O$), ammonium carbonate (e.g., $NH_3HCO_3$) and the like.

The temperature of the co-precipitation reaction may be controlled, for example, in a range of about 40° C. to 60° C. The reaction time may be controlled in a range of about 24 to 72 hours.

For example, the transition metal precursor may be reacted with the lithium precursor to prepare the lithium-transition metal composite oxide particles. The lithium precursor compound may include, for example, lithium carbonate, lithium nitrate, lithium acetate, lithium oxide, lithium hydroxide and the like. These compounds may be used alone or in combination of two or more thereof.

Thereafter, for example, lithium impurities or unreacted precursors may be removed through a water washing process, and metal particles may be fixed or crystallinity may be increased through a heat treatment (calcination) process. In one embodiment, the heat treatment may be performed at a temperature of about 600 to 1,000° C.

For example, the above-described grid deformation, XRD peak intensity ratio and XRD peak area ratio may be changed depending on a reaction time, a reaction temperature, a heat treatment temperature, and the like of the co-precipitation reaction.

A slurry may be prepared by mixing and stirring the cathode active material including the above-described lithium-transition metal composite oxide particles with a binder, a conductive material and/or a dispersant in a solvent. The slurry may be coated on the cathode current collector 105, followed by compressing and drying to manufacture the cathode 100.

The cathode current collector 105 may include, for example, stainless steel, nickel, aluminum, titanium, copper, or an alloy thereof, and preferably includes aluminum or an aluminum alloy.

The binder may include, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a cathode forming binder. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode 130 may include an anode current collector 125 and an anode active material layer 120 formed by coating the anode current collector 125 with an anode active material.

The anode active material useable in the present invention may include any material known in the related art, so long as it can intercalate and deintercalate lithium ions, without particular limitation thereof. For example, carbon-based materials such as crystalline carbon, amorphous carbon, carbon composite, carbon fiber, etc.; a lithium alloy; a silicon compound or tin may be used. Examples of the amorphous carbon may include hard carbon, cokes, mesocarbon microbead (MCMB), mesophase pitch-based carbon fiber (MPCF) or the like.

Examples of the crystalline carbon may include graphite-based carbon such as natural graphite, artificial graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The silicon compound may include, for example, a silicon-carbon composite compound such as silicon oxide or silicon carbide (SiC).

For example, a form of slurry may be prepared by mixing the anode active material with a binder, a conductive material and/or thickener in a solvent, followed by stirring the same. The slurry may be coated on at least one surface of the anode current collector 125, followed by compressing and drying to manufacture the anode 130.

As the binder and the conductive material, materials which are substantially the same as or similar to the above-described materials used in the cathode active material layer 110 may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

The separation membrane 140 may be interposed between the cathode 100 and the anode 130. The separation membrane 140 may include a porous polymer film made of a polyolefin polymer such as ethylene homopolymer, propylene homopolymer, ethylene/butene copolymer, ethylene/hexene copolymer, ethylene/methacrylate copolymer. The separation membrane 140 may include a nonwoven fabric made of glass fiber having a high melting point, polyethylene terephthalate fiber or the like.

In some embodiments, the anode 130 may have an area (e.g., a contact area with the separation membrane 140) and/or volume larger than those/that of the cathode 100. Thereby, lithium ions generated from the cathode 100 may smoothly move to the anode 130 without being precipitated in the middle, for example.

According to exemplary embodiments, an electrode cell is defined by the cathode 100, the anode 130, and the separation membrane 140, and a plurality of electrode cells are laminated to form, for example, a jelly roll type electrode assembly 150. For example, the electrode assembly 150 may be formed by winding, laminating, folding, or the like of the separation membrane 140.

The electrode assembly 150 may be housed in the case 160 together with an electrolyte to define the lithium secondary battery. According to exemplary embodiments, a non-aqueous electrolyte may be used as the electrolyte.

The non-aqueous electrolyte includes a lithium salt of an electrolyte and an organic solvent, and the lithium salt is represented by, for example, $Li^+X^-$, and as an anion ($X^-$) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3C^-$, $(CF_3SO_2)_2N^-$, $(FSO_2)_2N$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

As shown in FIG. 1, electrode tabs (a cathode tab and an anode tab) may protrude from the cathode current collector 105 and the anode current collector 125, respectively, which belong to each electrode cell, and may extend to one side of the case 160. The electrode tabs may be fused together with the one side of the case 160 to form electrode leads (a cathode lead 107 and an anode lead 127) extending or exposed to an outside of the case 160.

The lithium secondary battery may be manufactured, for example, in a cylindrical shape using a can, a square shape, a pouch type or a coin shape.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

Preparation of Lithium-Transition Metal Composite Oxide Particles $NiSO_4$, $CoSO_4$ and $MnSO_4$ were mixed in a ratio of 0.8:0.1:0.1, respectively, using distilled water with internal dissolved oxygen removed by bubbling with $N_2$ for 24 hours. The solution was introduced into a reactor at 50° C., and a co-precipitation reaction was performed for 72 hours using NaOH and $NH_3H_2O$ as a precipitant and a chelating agent to obtain $Ni_{0.8}Co_{0.1}Mn_{0.1}(OH)_2$ as a transition metal precursor. The obtained precursor was dried at 100° C. for 12 hours and then again dried at 120° C. for 10 hours.

Then, lithium hydroxide and the transition metal precursor were added in a ratio of 1.03:1 in a dry high-speed mixer, followed by uniformly stirring and mixing the same for 5 minutes. The mixture was put in a calcination furnace, heated to 950° C. at a heating rate of 2° C./min, and maintained at 950° C. for 12 hours. Oxygen was passed continuously at a flow rate of 10 mL/min during heating and maintenance. After completion of the calcination, the mixture was naturally cooled to room temperature, followed by grinding and classification to prepare lithium-transition metal composite oxide particles (first particles) in a form of single particles (including single crystal and polycrystalline structures) of the cathode active material $LiNi_{0.8}Co_{0.1}Mn_{0.1}O_2$.

Second to tenth particles were additionally prepared by changing the reaction time and the reaction temperature in the reactor, or the calcination time, the calcination temperature and heating rate in the calcination process. Through XRD analysis conducted on each of the lithium-transition metal composite oxide particles, the crystal grain size calculated using Equation 1 and the XRD peak intensity ratio calculated using Equations 2 and 3 were produced.

Meanwhile, specific XRD analysis equipment/conditions are as described in Table 1 below.

TABLE 1

| XRD(X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10-120° |
| Scan Step Size | 0.0065 |
| Divergence slit | ¼° |
| Antiscatter slit | ½° |

Example 1

A secondary battery was manufactured using the above-described first particles as a cathode active material. Specifically, the cathode active materials, Denka Black as a conductive material and PVDF as a binder were mixed in a mass ratio composition of 97:2:1, respectively, to prepare a cathode slurry. Then, the slurry was applied to an aluminum current collector, and a cathode was prepared through drying and pressing. After the pressing, a target electrode density of the cathode was controlled to 3.55 g/cc.

An anode slurry, which includes 93% by weight ('wt. %') of natural graphite as an anode active material, 5 wt. % of KS6 as a flake type conductive material, 1 wt. % of styrene-butadiene rubber (SBR) as a binder, and 1 wt. % of carboxymethyl cellulose (CMC) as a thickener, was prepared. The anode slurry was applied to a copper substrate, followed by drying and pressing to prepare an anode.

The cathodes and the anodes prepared as described above were respectively notched in a predetermined size and laminated, then an electrode cell was fabricated between the cathode and the anode with a separator (polyethylene, thickness: 25 μm) interposed therebetween. Thereafter, tap parts of the cathode and the anode were welded, respectively. A combination of the welded cathode/separator/anode was put into a pouch, followed by sealing three sides of the pouch except for one side into which an electrolyte is injected. At this time, a portion having the electrode tab was included in the sealing part. After injecting the electrolytic through the remaining one side except for the sealing part, the remaining one side was also sealed, followed by impregnation for 12 hours or more.

The electrolyte used herein was prepared by dissolving 1M $LiPF_6$ solution in a mixed solvent of EC/EMC/DEC (25/45/30; volume ratio), and adding 1 wt. % of vinylene carbonate (VC), 0.5 wt. % of 1,3-propene sultone (PRS), and 0.5 wt. % of lithium bis(oxalato)borate (LiBOB) thereto.

After then, pre-charging was conducted on the secondary battery prepared as described above with a current (5A) corresponding to 0.25 C for 36 minutes. After 1 hour, degassing then aging for 24 hours or more were conducted, followed by formation charging-discharging (charge condition: CC-CV 0.2 C 4.2 V 0.05 C CUT-OFF; discharge condition: CC 0.2 C 2.5 V CUT-OFF).

Example 2

A secondary battery was manufactured according to the same procedures as described in Example 1, except that the above-described second particles were used as a cathode active material.

Example 3

A secondary battery was manufactured according to the same procedures as described in Example 1, except that the above-described third particles were used as a cathode active material.

Example 4

A secondary battery was manufactured according to the same procedures as described in Example 1, except that the fourth particles were used as a cathode active material.

Example 5

A secondary battery was manufactured according to the same procedures as described in Example 1, except that the above-described fifth particles were used as a cathode active material.

Example 6

A secondary battery was manufactured according to the same procedures as described in Example 1, except that the above-described sixth particles were used as a cathode active material.

Example 7

A secondary battery was manufactured according to the same procedures as described in Example 1, except that the aforementioned seventh particles were used as a cathode active material.

Comparative Example 1

A secondary battery was manufactured according to the same procedures as described in Example 1, except that the aforementioned eighth particles were used as a cathode active material.

Comparative Example 2

A secondary battery was manufactured according to the same procedures as described in Example 1, except that the aforementioned ninth particles were used as a cathode active material.

Comparative Example 3

A secondary battery was manufactured according to the same procedures as described in Example 1, except that the above-described tenth particles were used as a cathode active material.

XRD analysis values and particle diameters of the lithium-transition metal composite oxide particles of the above-described examples and comparative examples are shown in Table 2 below.

TABLE 2

| Classification | | Crystal grain size (nm) | XRD peak intensity ratio | | D50 (μm) |
|---|---|---|---|---|---|
| | | | 100 × I(110)/ {I(110) + I(003)} | 100 × A(110)/ (A(110) + A(003)} | |
| Lithium-transition metal composite oxide particles | first particle | 196 | 7.9 | 16.3 | 10.9 |
| | Second particle | 177 | 9.4 | 16.6 | 13.4 |
| | third particle | 162 | 9.6 | 17.0 | 13.4 |
| | fourth particle | 262 | 9.6 | 16.6 | 11.6 |
| | fifth particle | 248 | 10.4 | 17.9 | 13.1 |
| | sixth particle | 295 | 12.3 | 19.1 | 9.7 |
| | seventh particle | 95 | 9.2 | 17.5 | 16.1 |
| | eighth particle | 308 | 9.4 | 16.8 | 8.3 |
| | nineth particle | 346 | 9.8 | 15.4 | 7.0 |
| | tenth particle | 240 | 6.8 | 18.7 | 5.2 |

TABLE 3

| Classification | Lithium-transition metal composite oxide particle | Gas generation amount at 60° C. (mL) | | Capacity retention rate at 45° C. (%) | | DCIR (mΩ) |
|---|---|---|---|---|---|---|
| | | After 1 week | After 4 weeks | After 100 cycles | After 300 cycles | |
| Example 1 | first particle | 15 | 28 | 98 | 90 | 4.04 |
| Example 2 | Second particle | 13 | 25 | 96 | 88 | 4.06 |
| Example 3 | third particle | 9 | 21 | 96 | 87 | 4.11 |
| Example 4 | fourth particle | 11 | 12 | 95 | 86 | 4.15 |
| Example 5 | fifth particle | 9 | 8 | 97 | 93 | 4.21 |
| Example 6 | sixth particle | 9 | 13 | 96 | 93 | 4.40 |
| Example 7 | seventh particle | 11 | 25 | 97 | 83 | 4.12 |
| Comparative Example 1 | eighth particle | 12 | 26 | 95 | 89 | 4.50 |
| Comparative Example 2 | nineth particle | 12 | 38 | 95 | 91 | 4.61 |
| Comparative Example 3 | tenth particle | 19 | 45 | 94 | 80 | 4.08 |

EXPERIMENTAL EXAMPLE (1) Measurement of Gas Generation Amount at High Temperature After charging (1 C 4.2 V 0.1 C CUT-OFF) the above-described lithium secondary batteries of the examples and comparative examples, amounts of gas generated after 1 week and 4 weeks after storage in a thermostatic chamber of 60° C. were confirmed through gas chromatography (GC) analysis. In order to measure a total gas generation amount, a hole was formed in the chamber under a vacuum of a predetermined volume (V), and a pressure change was measured to calculate a gas generation volume.

(2) Measurement of Life-Span (Capacity Retention Rate) at 45° C.

After repeatedly charging (CC-CV 1.00 4.2 V 0.05 C CUT-OFF) and discharging (CC 1.00 2.7 V CUT-OFF) the above-described lithium secondary batteries of the examples and the comparative examples 100 times and 300 times in a chamber at 45° C., capacity retention rates after 100 cycles were evaluated by calculating the discharge capacity at 100 times as a percentage (%) compared to the discharge capacity at one time, and capacity retention rates after 300 cycles were evaluated by calculating the discharge capacity at 300 times as a percentage (%) compared to the discharge capacity at one time.

(3) Measurement of Increase Rate in Internal Resistance (DCIR) at Room Temperature The lithium secondary batteries of the above-described examples and comparative examples were charged/discharged twice (SOC 100%) at 25° C. under 0.5 C, CC-CV condition, and charging again under 0.5 C CC-CV condition, then 0.5 C discharging was performed until reached SOC 50%. Thereafter, after leaving for 30 minutes, a voltage (first voltage) was measured.

Then, a voltage (second voltage) was measured after i) discharging at 1 C for 10 seconds, then leaving for 40 seconds, and ii) charging at 0.75 C for 10 seconds, then leaving for 40 seconds. DCIR was measured using a difference between the first voltage and the second voltage.

The evaluation results are shown in Table 3 below.

Referring to Table 3, in the case of examples in which lithium-transition metal composite oxide particles having a crystal grain size of less than 300 nm and satisfying the XRD peak intensity ratio of a predetermined value or more were used, good capacity retention rate and DCIR properties at room temperature were secured while suppressing the gas generation amount compared to the comparative examples as a whole.

Specifically, Examples 1 to 5, in which particles having a crystal grain size of 100 nm or more and less than 300 nm and an XRD peak intensity ratio of 7 to 12% were used, exhibited relatively high capacity retention rate and low resistance, such that excellent life-span properties and output properties were secured.

However, in the case of Example 6 in which particles having an XRD peak intensity ratio exceeding 12% were used, the migration length of lithium ions was increased compared to Examples 1 to 5, and slightly increased DCIR values were exhibited, thereby resulting in some deterioration in the output properties.

In addition, in the case of Example 7 in which particles having a crystal grain size of less than 100 nm were used, the particle strength is decreased and the possibility of occurring particle cracks during repeated charging and discharging is increased, such that the capacity retention rate according to the cycle repetition was somewhat decreased compared to Examples 1 to 5.

Comparative Examples 1 and 2, in which particles having a crystal grain size of exceeding 300 nm were used, exhibited a high resistance value since the migration length of lithium ions was excessively increased compared to the examples, and thereby the output properties of the secondary battery were decreased compared to the examples.

In the case of Comparative Example 3 in which particles having an XRD peak intensity ratio of less than 7% were used, the lithium ion migration path was shortened and a deterioration of the battery due to the cation mixing phenomenon occurred, such that the capacity retention rate according to the cycle repetition was decreased compared to the examples.

DESCRIPTION OF REFERENCE NUMERALS

100: Cathode
105: Cathode current collector
110: Cathode active material layer
120: Anode active material layer
125: Anode current collector
130: Anode
120: Anode active material layer
125: Anode current collector
140: Separation membrane
160: Case

What is claimed is:

1. A cathode active material for a lithium secondary battery, comprising lithium-transition metal composite oxide particles having a crystal grain size measured through X-ray diffraction (XRD) analysis of 100 nm or more and less than 300 nm and having an XRD peak intensity ratio defined by Equation 2 of 9% to 11%,
wherein the lithium-transition metal composite oxide particles include nickel, cobalt and manganese, and
a molar ratio of nickel of the lithium-transition metal oxide particles based on total moles of metals excluding lithium is 0.8 or more:

XRD peak intensity ratio (%)=100×$I$(110)/{$I$(110)+$I$(003)} [Equation 2]

wherein, in Equation 2, I(110) is a maximum height of a peak of a (110) plane of the lithium-transition metal composite oxide particles by the XRD analysis, and I(003) is a maximum height of a peak of a (003) plane of the lithium-transition metal composite oxide particles by the XRD analysis, and
wherein the crystal grain size is measured through Equation 1:

$$L = \frac{0.9\lambda}{\beta\cos\theta}$$ [Equation 1]

wherein, in Equation 1, L is the crystal grain size in nm, λ is an X-ray wavelength in nm, β is a full width at half maximum (rad) of the peak of the (003) plane, and θ is a diffraction angle in radian.

2. The cathode active material for a lithium secondary battery according to claim 1, wherein the lithium-transition metal composite oxide particles have the crystal grain size of 150 to 265 nm.

3. The cathode active material for a lithium secondary battery according to claim 1, wherein the lithium-transition metal composite oxide particles have an XRD peak area ratio defined by Equation 3 of 16% or more:

XRD peak area ratio (%)=100×$A$(110)/{$A$(110)+$A$(003)} [Equation 3]

wherein, in Equation 3, A(110) is a peak area of the (110) plane of the lithium-transition metal composite oxide particles by the X-ray diffraction (XRD) analysis, and A(003) is a peak area of the (003) plane by the XRD analysis.

4. The cathode active material for a lithium secondary battery according to claim 3, wherein the lithium-transition metal composite oxide particles have the XRD peak area ratio of 16 to 19%.

5. The cathode active material for a lithium secondary battery according to claim 1, wherein the lithium-transition metal composite oxide particles have a particle diameter ($D_{50}$) of 3 to 16 μm.

6. The cathode active material for a lithium secondary battery according to claim 1, wherein the lithium-transition metal composite oxide particles have a particle diameter of 10 to 15 μm.

7. The cathode active material for a lithium secondary battery according to claim 1, wherein the lithium-transition metal composite oxide particles have a composition represented by Formula 1 below:

$Li_xNi_{1-y}MyO_{2+z}$ [Formula 1]

wherein, in Formula 1, x, y and z are in a range of 0.95≤x≤1.2, 0≤y≤0.2, and −0.1≤z≤0.1, respectively, and M is Co and Mn.

8. The cathode active material for a lithium secondary battery according to claim 7, wherein the lithium-transition metal composite oxide particles are prepared by reacting a transition metal precursor with a lithium precursor.

9. The cathode active material for a lithium secondary battery according to claim 8, wherein the transition metal precursor is a Ni—Co—Mn precursor.

10. The cathode active material for a lithium secondary battery according to claim 7, wherein y of Formula 1 is 0.1 or less.

11. The cathode active material for a lithium secondary battery according to claim 1, wherein the lithium-transition metal composite oxide particles have a coating element,
and the coating element includes at least one element selected from a group consisting of Al, Ti, Ba, Zr, Si B, Mg and P.

12. The cathode active material for a lithium secondary battery according to claim 1, wherein the lithium-transition metal composite oxide particles have a doping element,
and the doping element includes at least one element selected from a group consisting of Al, Ti, Ba, Zr, Si B, Mg and P.

13. A lithium secondary battery comprising:
a cathode comprising a cathode active material layer including the cathode active material according to claim 1; and
an anode facing the cathode.

14. The lithium secondary battery of claim 13, wherein the anode comprises an anode current collector and an anode active material layer coating the anode current collector.

* * * * *